United States Patent [19]

Jacobson et al.

[11] 4,214,179

[45] Jul. 22, 1980

[54] ROTOR IMBALANCE DETECTOR FOR A CENTRIFUGE

[75] Inventors: Kenneth E. Jacobson, Fremont; William S. Gutierrez, San Francisco, both of Calif.

[73] Assignee: Beckman Instruments, Inc., Fullerton, Calif.

[21] Appl. No.: 20,894

[22] Filed: Mar. 15, 1979

[51] Int. Cl.² .................... H02K 11/00; B04B 9/02; H01H 35/02
[52] U.S. Cl. ................. 310/68 B; 200/61.45 R; 233/24
[58] Field of Search .................... 310/66, 68 E, 68 B, 310/68 R, 157; 68/23.3; 200/61.45 R; 233/23 A, 23 R, 24; 34/58; 366/251, 282, 349, 601; 73/660

[56] References Cited

U.S. PATENT DOCUMENTS

| 2,666,572 | 1/1954 | Pickels | 233/24 |
|---|---|---|---|
| 2,895,023 | 7/1959 | Blum et al. | 200/61.45 R |
| 3,101,322 | 8/1963 | Stallman et al. | 233/24 |
| 3,422,957 | 1/1969 | Foster | 73/660 |
| 3,676,723 | 7/1972 | Drucker | 310/68 B |
| 3,699,287 | 10/1972 | Stahl et al. | 200/61.45 R |
| 3,783,978 | 1/1974 | Hamilton | 200/61.45 R |
| 3,911,731 | 10/1975 | Walker | 73/660 |

Primary Examiner—Mark O. Budd
Attorney, Agent, or Firm—R. J. Steinmeyer; F. L. Mehlhoff

[57] ABSTRACT

An improved rotor imbalance detector for a centrifuge comprising a rotatable electrically conducting ring; means to support and insulate the conducting ring from the centrifuge spindle shaft, and yet permit rotational movement of the conducting ring with respect to the support means, when the conducting ring is struck by the centrifuge drive spindle during an imbalance condition, means for de-energizing the power supplied to the centrifuge motor which rotates the drive spindle, and an electrically conducting lead in electrical contact with the conducting ring and the de-energizing means.

5 Claims, 3 Drawing Figures

ROTOR IMBALANCE DETECTOR FOR A CENTRIFUGE

BACKGROUND OF THE INVENTION

It is known that a rotating body such as the rotor of a centrifuge rotates about an axis through the center of gravity of the rotating body. When the loading of the centrifuge rotor is improper, it sometimes changes the center of gravity of the rotor resulting in an axis of rotation not passing directly through the volumetric center of the rotor. For the purpose of limiting damage to the centrifuge, imbalance detectors are incorporated in the design of the centrifuge to de-energize the motor which drives the rotor.

U.S. Pat. No. 2,895,023, Blum, describes a rotor imbalance detector in which rotor imbalance causes a movable rod to be thrown out, actuating a microswitch which is mounted beneath the rotor. The microswitch causes the motor to be de-energized. After the operator has corrected the imbalance, the imbalance detector must be reset. The Blum design also makes the centrifuge more complex and costly to produce.

The imbalance detector described by U.S. Pat. No. 3,699,287, Stahl et al., must also be reset following imbalance. Actuating means such as a screw is mounted to the rotor itself. When the rotor becomes imbalanced, the actuating means trips a switch adjacent to the periphery of the rotor where the actuating means is carried, causing the motor driving the rotor to be de-energized.

Drucker et al., U.S. Pat. No. 3,676,723, mounts a tubular member to the motor frame of the centrifuge which is electrically connected into a motor de-energizing circuit. When the rotor and spindle become imbalanced, a tubular contact means, mounted on the spindle, in coaxial relationship therewith, contacts the tubular member, thereby shorting out the circuit, causing the motor to de-energize. The tubular contact means is mounted on and rotatably spinning with the drive spindle. Thus contact of the tubular contact means with the tubular member, which is fixed to the motor frame, may impart a rotational force to the tubular member. Since the tubular member is fixed and cannot rotate, the tubular member may be damaged as a result of its inability to rotate, thereby disrupting its electrical connection with the electrical lead to the motor de-energizing circuitry.

SUMMARY OF THE INVENTION

The instant invention is an improved rotor imbalance detector for a centrifuge. An improvement of the present invention over the prior art is the incorporation of a rotatable member in the detector which when contacted with the imbalanced drive spindle, is able to rotate and eliminate damage to the detector. The imbalance detector need not be rest after the imbalance condition has been corrected. The imbalance detector comprises a rotatable electrically conducting ring supported in the drive spindle assembly of the centrifuge; insulating support means which insulate and support the conducting ring in the drive spindle assembly, and yet permits rotational movement of the conducting ring, means for de-energizing the power to the centrifuge motor, and a conductive lead in contact with the motor de-energizing means and the conducting ring.

DESCRIPTION OF THE PREFERRED EMBODIMENTS

Figure 1:
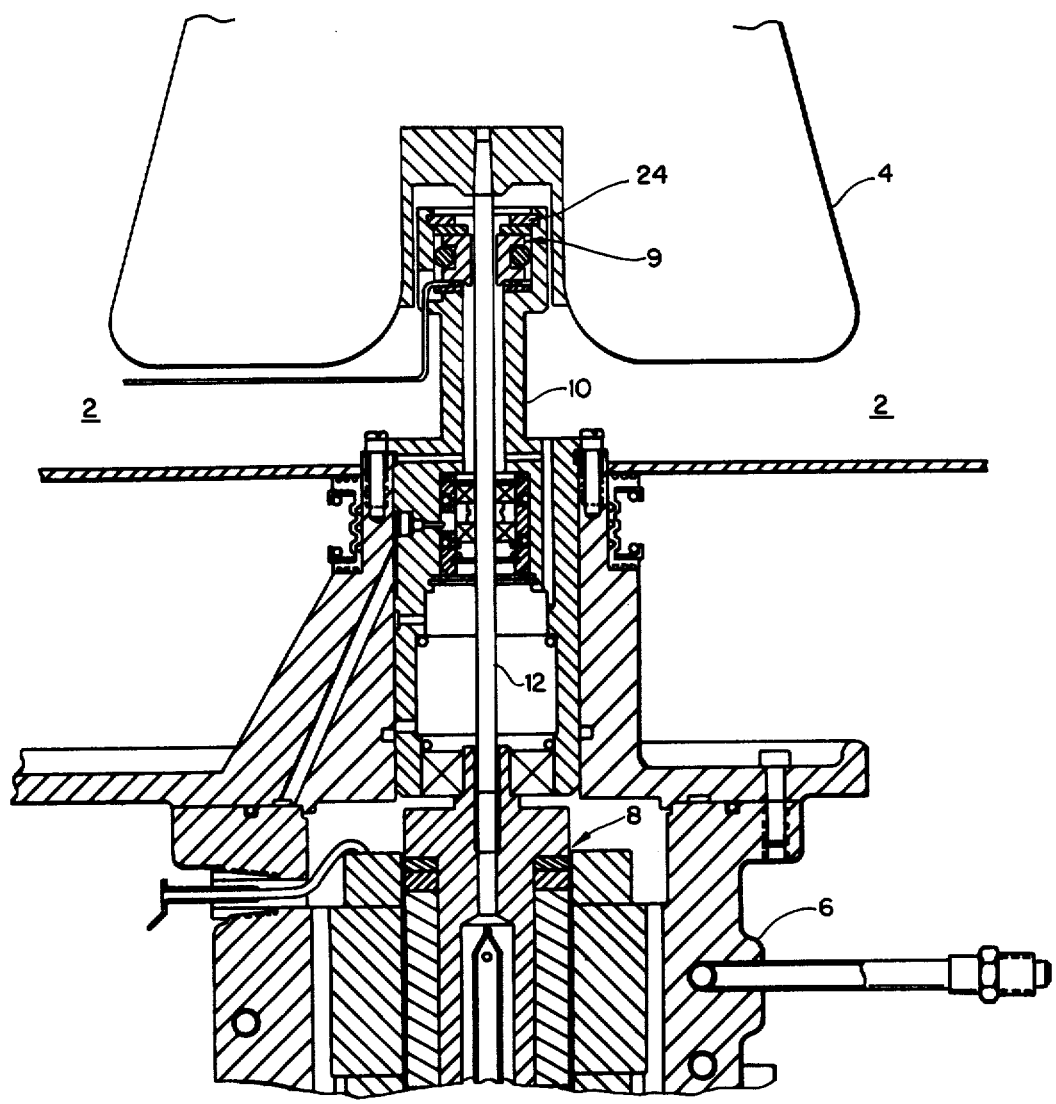
FIG. 1 is a cross-sectional view of a centrifuge with the improved rotor imbalance detector.
2.

FIG. 1 illustrates a centrifuge which includes rotor 4 and rotor chamber 2. Drive spindle assembly, generally designated 10, extends vertically up from motor 8 mounted in motor housing 6 supported beneath the chamber. Drive spindle 12 is mounted in drive spindle assembly 10 and is electrically connected to ground. Snap ring 24 holds rotor imbalance detector 9 in drive assembly 10.

Figure 2:
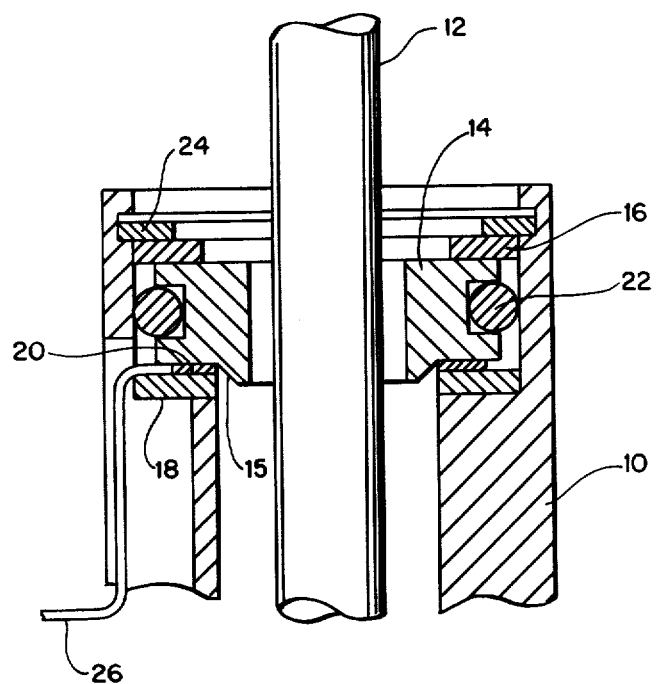
FIG. 2 is an enlarged cross-sectional view of the rotor imbalance detector shown in FIG. 1.
3.

Referring now to FIG. 2, there is shown a detailed view of rotor imbalance detector 9. A rotatable electrically conducting ring 14 surrounds and is concentric with drive spindle 12. An upper insulating washer 16, lower insulating washer 18 and nonconductive O-ring 22 electrically insulate conducting ring 14 from drive spindle assembly 10. Washers 16 and 18 are set in counter-bored areas of drive spindle assembly 10. Washer 16 is in direct engagement with the upper face of conducting ring 14 nearest to rotor chamber 2; however, the engagement of conducting ring 14 with washer 16 does not prevent conducting ring 14 from exhibiting rotatable movement. Washer 18 is not in direct engagement with conducting ring 14.

A non-rotatable disc 20 is sandwiched in between conducting ring 14 and washer 18. The non-rotatable disc 20 also does not prevent conducting ring 14 from exhibiting rotatable movement, and is electrically conducting and insulated from drive spindle assembly 10 by washer 18. Additionally, non-rotatable disc 20 is set in a fixed position in a counter-bored area of drive spindle assembly 10, and is in contact with lead wire member 26 which is preferably soldered to non-rotatable disc 20. The face of conducting ring 14 engaged with electrically conducting, non-rotatable disc 20 has a slant element 15 which effectively prevents non-rotatable disc 20 from moving in a direction toward drive spindle assembly 10. This prevents electrical contact between non-rotatable disc 20 and drive spindle assembly 10. A portion of the periphery of conducting ring 14 is recessed. O-ring 22 is set in the recessed periphery of conducting ring 14 and also touches the interior wall of drive spindle assembly 10. Snap ring 24 is mounted in a counter-bored area of drive spindle assembly 10 and holds washers 16 and 18, conducting ring 14, and non-rotatable disc 20 in drive spindle assembly 10. Washers 16, 18 and non-rotatable disc 20 are concentric with drive spindle 12 and are spaced therefrom a greater distance than conducting ring 14.

During operation of the centrifuge, rotor 4 may become imbalanced due to improper loading of the contents in angle tube rotors or improper loading of buckets in swinging bucket rotors, or for other reasons well known in the art. When rotor 4 is imbalanced, drive spindle 12 either precesses about its axis or rotates in an axis other than its normal axis.

If the effect of the imbalance is such that it might damage the rotor of the centrifuge, the space between conducting ring 14 and drive spindle 12 is so designed as to cause spindle 12 to contact conducting ring 14. The imbalanced drive spindle 12 transfers a rotatable force to conducting ring 14, which is free to rotate and slide between washer 16, and non-rotatable disc 20, mounted in a fixed position. On contact, the spinning, imbalanced drive spindle 12 transfers a tremendous rotatable force to conducting ring 14. Because conducting ring 14 is able to slidably rotate about the rotational axis of drive spindle 12, damage to imbalance detector 9, as a result of the transfer of the rotatable force from the imbalanced drive spindle 12, is eliminated. The contact of conducting ring 14 with the imbalanced drive spindle 12 grounds the de-energizing circuit in contact with conducting ring 14, causing a shutdown of motor 8.

Figure 3:
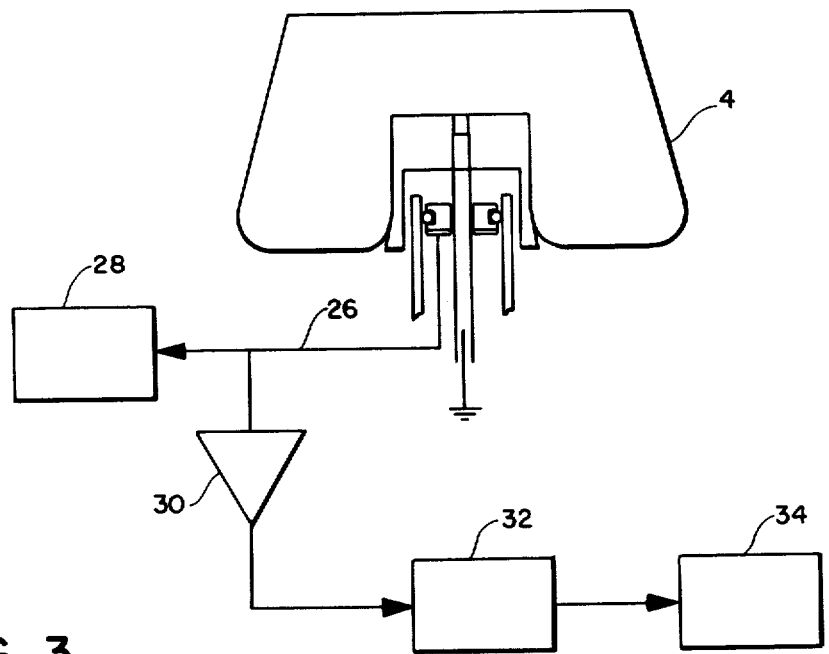
FIG. 3 is a schematic circuit diagram of a proposed de-energizing means for use with the imbalance detector.

FIG. 3 illustrates a schematic diagram of the circuit for de-energizing the power to motor 8. Normally during operation of the centrifuge, the motor and drive spindle 12 are grounded. Conducting ring 14 is isolated from this ground and is in contact with a circuit via non-rotatable disc 20 and wire member 26, which is preferably soldered to disc 20, creating a conductive lead to the de-energizing means. The de-energizing means is comprised of means for generating electrical power, such as a 12 volt power supply 28, a buffer member 30 which is in contact with power supply 28, and holds high and low signals from power supply 28, a microprocessor 32 in contact with buffer 30, and motor control 34 in contact with microprocessor 32.

During operation of the centrifuge with the rotor balanced to an acceptable level, voltage is applied by power supply 28 to buffer 30. Buffer 30 transfers a high signal to microprocessor 32 which in turn sends a signal to motor control 34. Motor control 34 then permits power to be supplied to motor 8. When rotor 4 becomes imbalanced to an undesired degree, the drive spindle 12 contacts conducting ring 14, causing some of the voltage from power supply 28 to be grounded via non-rotatable disc 20, wire member 26, and conducting ring 14, which has come into contact with drive spindle 12. Reduced voltage is supplied to buffer 30. Buffer 30 then sends a low signal to microprocessor 32, causing motor control 34 to discontinue the power supplied to motor 8. Rotor 4 then decelerates to a stop. The operator is informed of this condition, by a warning light or other appropriate warning device. Before initiating the operation of the centrifuge, the operator must correct the imbalance condition. Once the imbalance has been corrected, there is no need to reset imbalance detector 9, because the conducting ring 14 is always retained in a position concentric to the normal rotational axis of the shaft.

As is apparent, the specific embodiments described herein may be altered and changed by those skilled in the art without departing from the true spirit and scope of the invention which is described in the appended claims.

What is claimed is:

1. A centrifuge having a rotor chamber and a motor mounted beneath the chamber; a drive spindle assembly extending from the motor to the rotor chamber; a drive spindle mounted in the drive spindle assembly extending into the chamber, the drive spindle being electrically connected to ground; a rotor adapted to be mounted on the drive spindle; and an improved rotor imbalance detector comprising:

a rotatable electrically conducting ring supported in the drive spindle assembly, surrounding and concentric with the drive spindle but spaced therefrom a predetermined amount so that the conducting ring is only contacted by the spindle when the spindle becomes imbalanced to a predetermined extent, the conducting ring being so constructed and arranged as to rotate when contacted with the imbalanced spindle;

insulating support means in the drive spindle assembly supporting the conducting ring in a spaced relation with the spindle, insulating the conducting ring from contact with the spindle assembly, and yet permitting rotational movement of the conducting ring with respect to the insulating support means;

means for de-energizing the power supplied to the motor; and a conductive lead, having a portion thereof in electrical contact with the conducting ring, for grounding an electrical signal from the de-energizing means when an imbalanced rotor causes the electrically grounded spindle to move out of its normal axis of rotation and contact the conducting ring, the lead being in sliding contact with the conducting ring so that the lead remains in continuous contact with the conducting ring.

2. The centrifuge as defined in claim 1, wherein the insulating support means comprises:

an upper washer supporting and insulating the conducting ring, allowing the conducting ring to rotate when the imbalanced drive spindle contacts the conducting ring;

a lower washer supporting and insulating the conductive lead which contacts the conducting ring, allowing the conducting ring to rotate when the imbalanced drive spindle contacts the conducting ring;

an O-ring around the periphery of the conducting ring, electrically insulating the conducting ring from electrical contact with the drive spindle assembly; and a snap ring mounted in the spindle shaft, holding the upper and lower washers, the non-rotatable disc, and the conducting ring in place in the spindle shaft.

3. The centrifuge as defined in claim 2, wherein the periphery of the conducting ring has a recessed area, with the insulating O-ring touching the conducting ring in the recessed area.

4. The centrifuge as defined in claim 2, wherein the conductive lead comprises:

a non-rotatable disc mounted to the lower washer and which will not rotate during imbalance of the drive spindle; and a wire member contacting the non-rotatable disc and the de-energizing means, transmitting an electrical impulse generated by the de-energizing means to the conducting ring.

5. The centrifuge as defined in claim 3, wherein the de-energizing means is comprised of:

means for generating electrical power, in contact with the wire member;

a buffer member in contact with the electrical power means, to hold high and low signals from the power means;

a microprocessor in contact with the buffer member; and motor control means in contact with the microprocessor and the motor, causing power supplied to the motor to be discontinued upon receipt of a signal from the microprocessor.

* * * * *